United States Patent [19]

Chang et al.

[11] 3,967,831
[45] July 6, 1976

[54] SPRING COIL HOLDING DEVICE

[76] Inventors: Ming-Chao Chang, No. 61-28, 18 Lin, Chung Chou Li, Shih Lin, Taipei; Chun-Ya Chen, No. 1 Kuo Chun St., San Chung, Taipei Hsien, both of China

[22] Filed: Oct. 21, 1974

[21] Appl. No.: 516,670

[52] U.S. Cl. .............................. 279/23 R; 403/229
[51] Int. Cl.² .......................................... B23B 31/04
[58] Field of Search ............... 279/23, 9 R; 403/229, 403/350, 372; 408/241; 64/15 C

[56] References Cited
UNITED STATES PATENTS

| | | | |
|---|---|---|---|
| 1,552,085 | 9/1925 | Shiek | 408/241 X |
| 2,105,330 | 1/1938 | Pagenkopf | 279/9 R |
| 2,559,895 | 7/1951 | Norlander | 279/23 |
| 3,158,767 | 11/1964 | Schoning | 64/15 C |

Primary Examiner—Othell M. Simpson
Assistant Examiner—Z. R. Bilinsky
Attorney, Agent, or Firm—Shoemaker and Mattare, Ltd.

[57] ABSTRACT

A spring coil holding device utilizing an integral multi-stage spring coil placed in an actuating sleeve and a housing sleeve, said integral spring coil is actuated to enlarge to a proper caliber by means of said actuating sleeve and housing sleeve for releasing a rod-shaped object or is restored to its original condition by its own resilience for clamp-holding a rod-shaped object.

2 Claims, 6 Drawing Figures

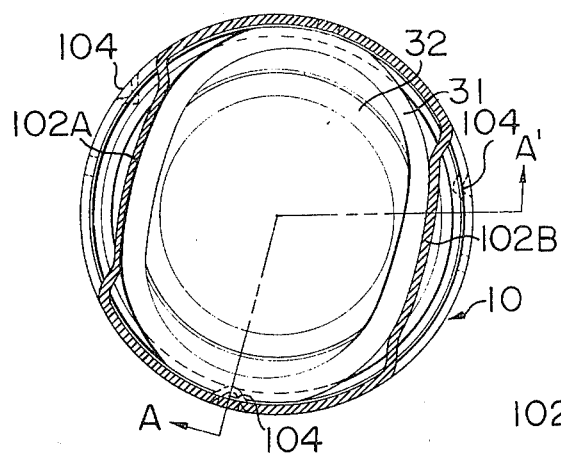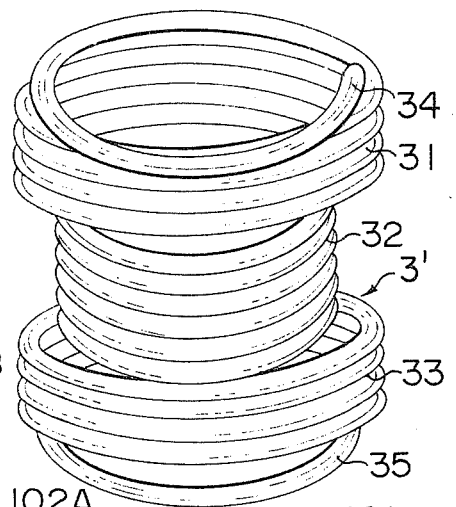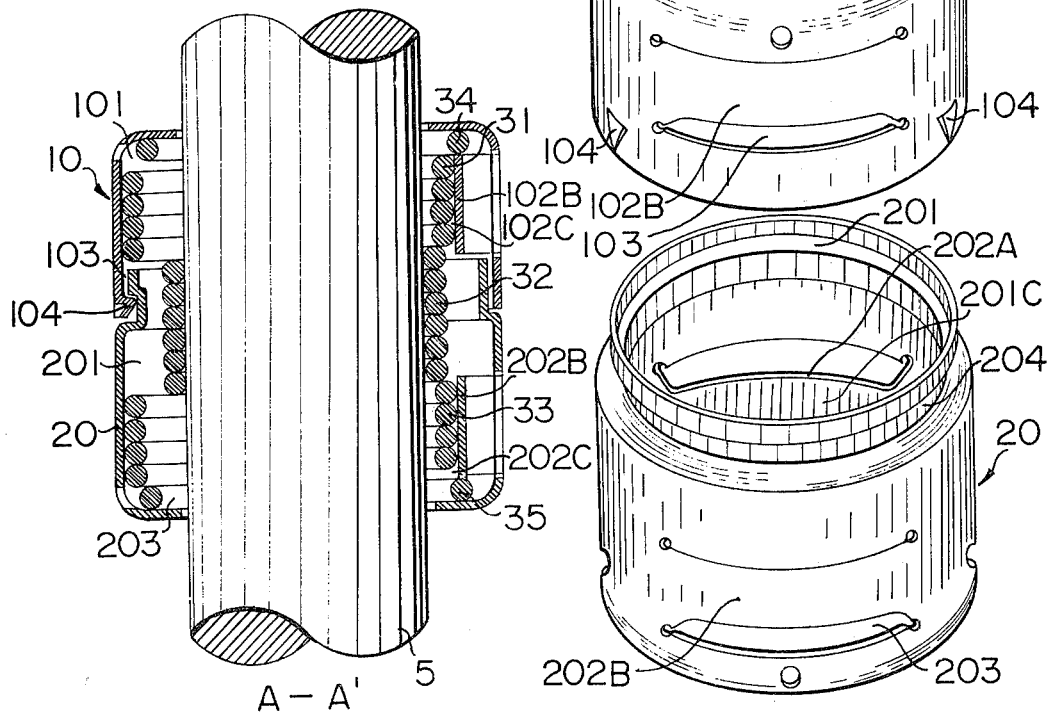

SPRING COIL HOLDING DEVICE

BACKGROUND OF THE INVENTION

The present invention relates to a device for holding a rod-shaped object through an operating mechanism utilizing spring coil characteristics and, more particularly, this invention is provided with a multi-stage integrated continuously coiled spring placed in an operating mechanism, and said spring is actuated to enlarge to a proper calibre by means of said mechanism or is restored to its original condition by its own resilience.

The conventional clamp-holding for a rod-shaped object is generally effected by a three-claw attachment; for example, the fixture of a whole set of screwdrivers and the three-claw fixture of thread-tap and so on. Said three-claw attachment needs a high precision. The cost is high, and in addition, during operation, said claw attachment must be firstly loosened and then screwed tight after the rod-shaped object is inserted. It requires a considerable effort in operation and is difficult to be quickly set for precise centerization.

SUMMARY OF THE INVENTION

The primary object of the present invention is to provide a multi-stage spring coil holding device of simple construction and accurate performance to facilitate the holding and the releasing of a rod-shaped object.

Another object of the present invention is to provide a multi-stage spring coil holding device to facilitate clamping any rod-shaped objects, and the size of the clamped portion of the rod-shaped objects is as same as the inside diameter of the middle stage of said spring coil.

BRIEF DESCRIPTION OF THE DRAWINGS

These and other objects of the present invention will become more apparent from the following description of the preferred embodiments taken in conjunction with the accompanying drawings in which:

FIG. 4 depicts a perspective view of three separate elements of the second embodiment according to the present invention;

FIG. 5 depicts a top sectional view of the second embodiment with an inserted rod-shaped object according to the present invention;

FIG. 6 is a sectional view along line A—A' FIG. 5.

DETAILED DESCRIPTION OF THE INVENTION

Figure 1:
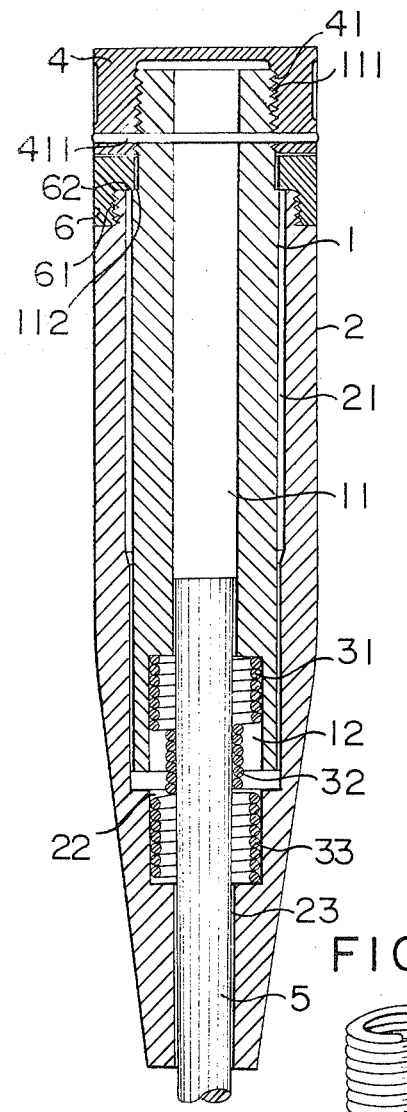
FIG. 1 depicts a cross-sectional view of the first embodiment holding tight a rod-shaped object according to the present invention.
Figure 2:
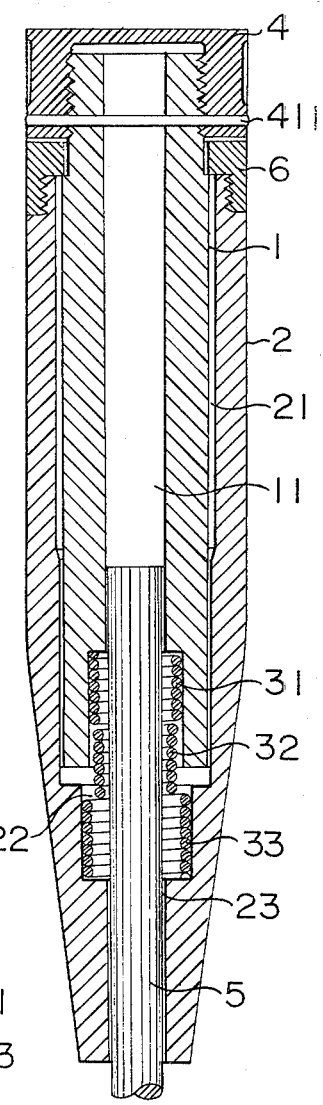
FIG. 2 depicts a cross-sectional view of the first embodiment releasing a rod-shaped object according to the present invention.
Figure 3:
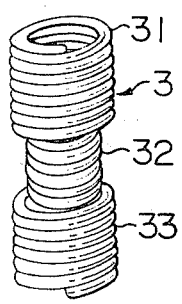
FIG. 3 depicts a perspective view of the first embodiment of spring coils according to the present invention.

As shown in FIGS. 1 to 3, the first embodiment of the holding device is composed of an actuating sleeve 1, a housing sleeve 2 and an integral three-stage spring coil 3. Said actuating sleeve 1 has a circular space 11 and an elliptical space 12 communicating with each other. Said housing sleeve 2 has a longitudinal circular space 21 and an elliptical space 22 communicating with each other, and with a small bore 23 at the bottom of housing sleeve for inserting a rod-shaped object 5 to be inserted from outside. Said integral three-stage spring coil 3 is continuously coiled and consists of and upper stage 31 and lower stage 33 of an ellipsoid shape, together with a middle stage 32 of a round or cylindrical shape. The upper ellipsoid stage 31 is placed in the elliptical space 12 of the actuating sleeve 1 and the lower ellipsoid stage 33 is fitted in the elliptical space 22 of the housing sleeve 2. After assembling together the actuating sleeve 1 and the integral three-stage spring coil 3 into the housing sleeve 2, both the elliptical coil of stages 31, 33 of the spring coil 3 are tightly contacted within the inner walls of the elliptical spaces 12 and 22 of actuating sleeve 1 and housing sleeve 2 respectively, and the rod-shaped object 5 is inserted from the small bore 23 at the bottom of the housing sleeve 2 for passing through the inside of each stage of lower, middle and upper spring coil 3 to the upper space 11 of said actuating sleeve 1, and then is clamp-held by a plurality of turns of the middle stage of circular coil 32. Male threads 111 are provided on the top end of said actuating sleeve 1 for engaging with the female threads 41 of a rotating cap 4 and, a lock pin 411 is used to fix together said actuating sleeve 1 with said rotating cap 4. So said rotating cap 4 can rotate said actuating sleeve 1 to transmit the torsional force on spring coil 3. A stop 6 is provided with female threads 61 for engaging with said housing sleeve 2 and the inside flange 62 of said stop 6 with a slightly smaller inside diameter than the outside diameter of the recess 112 of actuating sleeve 1, so it can jam the latter effectively in place. Thus both sleeves 1 and 2 will not fall apart, but can rotate relative to each other freely.

As shown in FIG. 1, the rod-shaped object 5 (such as the head of a screwdriver, the head of a tap and so on) is held very tightly by virtue of the clamping of the resilience exerted by spring force of the middle stage of circular spring coil 32. If it is desired to remove or replace said rod-shaped object 5, said rotating cap 4 must be rotated in the opposite direction of the winding of said spring coil 3 to turn said actuating sleeve 1 a certain degree; owing to the engagement of the upper elliptical stage 31 of said spring coil 3 with the elliptical inside space 12 of said actuating sleeve 1 and of the lower elliptical stage 33 of said spring 3 with the elliptical inside space 22 of said housing sleeve 2, the rotation of said actuating sleeve 1 enables the spring coil 3 to extend its upper stage 31 in the opposite direction of its winding upon its lower stage 33 as a fixed fulcrum and, further, to transmit the extension of the middle stage 32 from the upper stage 31 of said spring coil integral 3; thus the inside diameter of said middle stage coils will be slightly enlarged by actuation of extension force from cap 4 and said rod-shaped object 5 can be loosened, removed or replaced or moved freely upward or downward as shown in FIG. 2. If the grasp of the rotating cap 4 is released, the spring coil integral 3 will rebound back automatically by virtue of its own resilience and the original status of clamp-holding as shown in FIG. 1 will be obtained again.

Referring from FIG. 4 to FIG. 6, the second embodiment, which is a new development of a double fixation holder device of the present invention, is shown. The construction of this five-stage spring coil is almost the same as that of the first embodiment except that one or more circular spring coils 34 & 35 are added respectively at the top and the bottom stage of the spring coil to form a five-stage spring coil 3'. The function of a modified actuating sleeve 10 as well as a modified housing sleeve 20 is to match with said spring coil 3. Said actuating and housing sleeves 10 & 20 have two depressed walls 102A, 102B and 202A, 202B to form an elliptical space 102C and 202C in the internal side of said actuating and housing sleeves respectively.

A plurality of protrusions 104 of said actuating sleeve 10 can be inlayed on the depressed ring 204 of said housing sleeve 20 for connecting both sleeves tightly. All of the spaces 101, 103, 201 and 203 are of circular shape.

The top stage 34 and the bottom stage 35 of said five-stage spring coil 4 is placed in the space 101 and 203 respectively and, the elliptical stages 31 and 33 are placed in the spaces 102C and 202C respectively. The assembly of this embodiment is now completed and forms a double fixation device.

The most important feature of this embodiment is that the top and bottom coils 34 and 35 of said five-stage spring coil 3' effectively prevent said actuating sleeve and housing sleeve 10, 20 from being separated or disengaged, because both the top stage spring coil 34 and bottom stage spring coil 35 have larger diameters than the elliptical space 102C and 202C of the corresponding actuating sleeve and housing sleeve 10 and 20 and they are manufactured as continuous five-stage integrated spring coils so spring coils 34 and 35 can keep said actuating and housing sleeves 10 and 20 tightly engaged by exerting the resilience force of said spring. The operating principle of this embodiment is the same as mentioned above, so the relevant description is not necessary to repeat again.

The foregoing description is intended to be only illustrative of the principles of the present invention. Numerous variations and modifications thereof would be apparent to one skilled in the art, that is, the utilization of the characteristics of a spring coil and the coordination with a rotary operating mechanism to achieve the performance of holding a rod-shaped object. However, there are many ways to rotate the actuating sleeve 1 mentioned above, for example, a cross bar can be connected to said sleeve to extend outside for rotating said actuating sleeve 1; same reason, a cross bar can be connected to either the actuating or the housing sleeve to extend outside for remote control of the operation. Other modifications of said spring coil integral are whether the outside diameters of various stages are of the same size or not, or whether the shape of coil of various stages are circular, elliptical or the like. All such variations and modifications are to be considered to be within the technique and scope of the present invention.

We claim:

1. A spring holding device for clamping a rod-shaped object comprising:
    a housing sleeve having a bore therethrough;
    an actuator sleeve having a bore therethrough and coaxially disposed within said housing sleeve so that one end of said actuator sleeve projects axially beyond a corresponding adjacent end of said housing sleeve, said housing and actuator sleeves being rotatable relative to one another;
    a coil spring having at least three sections integral with each other and each section comprising a plurality of coils, said sections including an end section at each end of the coil spring and a center section joining the end sections, said center section having a circular configuration and being smaller in diameter than the end sections and the end sections both being substantially elliptical in transverse configuration whereby the end sections may be operatively engaged and turned relative to one another to expand the coils of the center section to release a rod-shaped object gripped by the coils of the center section, and the natural resiliency of the coils is such that the center section automatically closes on and grips a rod-like object inserted thereinto, and
    a cap secured on the projecting end of the actuator sleeve, the other end of the housing sleeve projecting axially beyond the adjacent, other end of the actuator sleeve, said sleeves having axially aligned circular bores therethrough, a portion of the bore in the actuator sleeve at the other end thereof and an adjacent portion of the bore in the housing sleeve being elliptical in transverse cross-section, and one of said end sections of said spring disposed in said actuator sleeve elliptical bore portion and the other end section of said spring being disposed in said housing sleeve elliptical bore portion so that, upon rotation of said sleeves relative to one another, said spring end sections rotate relative to one another to expand the coils of the center section.

2. A spring coil holding device for clamping a rod-shaped object, comprising a coil spring having at least three sections integral with each other and each section comprising a plurality of coils, said sections including an end section at each end of the coil spring and a center section joining the end sections, said end sections having a non-circular configuration and the center section having a circular configuration and wherein the center section is smaller in diameter than the end sections and the end sections are substantially elliptical in transverse configuration with the endmost coils at the outer ends of the end sections being circular in configuration thus defining a coil having five integral sections, said coil end sections being disposed in an actuator sleeve and a housing sleeve, respectively, said sleeves being coaxially disposed and rotatable relative to one another, and secured together in substantially end-to-end relationship, said sleeves being circular in transverse configuration and each having radially inwardly depressed portions at opposite sides thereof, cooperating with the elliptical end sections of the coil spring, said circular end coils of the coil spring being engaged behind the inwardly depressed portions to retain the coil spring axially in position, whereby the end sections may be operatively engaged and turned relative to one another to expand the coils of the center section to release a rod-shaped object gripped by the coils of the center section, and the natural resiliency of the coils is such that the center section automatically closes on and grips a rod-like object inserted thereinto.

* * * * *